United States Patent [19]

Arizono

[11] Patent Number: 4,788,660
[45] Date of Patent: Nov. 29, 1988

[54] DATA BUS BUFFER CONTROL CIRCUIT

[75] Inventor: Takeshi Arizono, Hyogo, Japan

[73] Assignee: Mitsubishi Denki Kabushiki Kaisha, Tokyo, Japan

[21] Appl. No.: 851,182

[22] Filed: Apr. 14, 1986

[30] Foreign Application Priority Data

Sep. 18, 1985 [JP]   Japan .................................. 60-208019

[51] Int. Cl.$^4$ ................................................ G06F 3/00
[52] U.S. Cl. ..................................................... 364/900
[58] Field of Search ................................. 364/200, 900

[56] References Cited

U.S. PATENT DOCUMENTS

| | | | |
|---|---|---|---|
| 3,651,487 | 3/1972 | Washington | 364/200 |
| 4,419,724 | 12/1983 | Branigan | 364/200 |
| 4,438,507 | 3/1984 | Nakajima | 364/200 |
| 4,468,753 | 8/1984 | Berger | 364/900 |
| 4,507,732 | 3/1985 | Catiller et al. | 364/200 |

*Primary Examiner*—Gareth D. Shaw
*Assistant Examiner*—John G. Mills
*Attorney, Agent, or Firm*—Sughrue, Mion, Zinn, Macpeak & Seas

[57] ABSTRACT

A data bus buffer control circuit which is capable of delaying a data bus buffer output for a period corresponding to an arbitrary number of clock periods. A counter provided at an output of a write data output delay selection device is presettable by a read/write signal during read periods so that the number of clock periods to be preset is varied according to a desired delay. The counter counts the clock signal supplied through a logic circuit after commencement of the write cycle. When the content of the counter reaches the desired value, it provides an output by which the data bus buffer is enabled. Since the delay of the write data output is set every read cycle, it is possible to provide an optimum delay of the write data output for an accessed device and to interface low speed devices by increasing the number of bits of the counter.

5 Claims, 2 Drawing Sheets

DATA BUS BUFFER CONTROL CIRCUIT

BACKGROUND OF THE INVENTION

The present invention relates to a data buffer control circuit and, particularly, to an interface arranged between a CPU and a low speed device under the data bus control of the CPU.

FIG. 1 shows an example of a conventional control circuit for this purpose, which corresponds to FIGS. 4–15 of "Intel: APX 286 Hardware Reference Manual 1983".

The conventional control circuit shown in FIG. 1 includes a data bus buffer 1, a data transfer/receive (DT/$\overline{R}$) signal line 2 for transmitting a DT/$\overline{R}$ signal which is supplied to a direction (DIR) signal input of the data bus buffer 1 for determining the direction of data flow, a flip-flop circuit 3 including a pair of series connected flip-flops for temporarily storing the DT/$\overline{R}$ signal, a clock signal line 4 for supplying a timing reference signal to the flip-flop circuit 3, a data enable (DEN) signal line 5 for indicating whether the CPU (not shown) is performing a reading or writing operation, a bus select signal line 6 for indicating that the data bus buffer 1 is selected, and a control logic circuit 7 composed of NAND gates 71 and 72 and responsive to the signals from the DT/$\overline{R}$ signal line 2, the flip-flop circuit 4, the DEN signal line 5, and the bus select signal line 6 to produce a data bus buffer output enable ($\overline{OE}$) signal. The DT/$\overline{R}$ signal line 2, the flip-flop circuit 3, the clock signal line 4, the DEN signal line 5, the bus select signal line 6, and the control logic circuit 7 constitute a data bus buffer control circuit 8.

In operation, when the CPU is in a read condition, i.e., the DT/$\overline{R}$ signal is in the "0" state, the control logic circuit 7 controls the output of the data bus buffer 1 according to outputs of the DEN signal line 5 and the bus select signal line 6. That is, since a logic "0" signal is supplied to the DIR input of the data bus buffer 1 and the DT/$\overline{R}$ signal line connected to one input of the NAND gate 71 is at the "0" level, the output of the NAND gate 71 is "1". Therefore, all of the inputs of the NAND gate 72 are "1", and thus it provides a "0" output. Consequently, the $\overline{OE}$ signal is supplied to the OE input of the data bus buffer 1, which connects the data to the CPU data bus. On the other hand, when the CPU is in a write condition, i.e., when the DT/$\overline{R}$ signal is "1", the output period of the data bus buffer 1 is restricted by the output of the flip-flop 3 which stores the preceding bus condition. The flip-flop 3 stores the condition of the previous DT/$\overline{R}$ signal 2 for 2 clocks and, when the stored condition is the read condition, the output of the NAND gate 71, rather than the NAND gate 72, is "0" during the period of the initial two clocks of the write cycle, even when the signals on the DEN signal line 5 and the bus select signal line 6 are effective. Therefore the output of the data bus buffer 1 is not enabled. Thus, coincidence of floating data which is read out of the read device immediately after the read cycle and write data outputted from the CPU through the data bus buffer during the write period on the local bus can be avoided.

The conventional data bus buffer control circuit employs a fixed number of clock periods for which the write data output immediately after the read cycle is delayed (in the example in FIG. 1, the delay corresponds to two clock periods) and, therefore, it is not always possible to suitably delay the write data output to be supplied to devices operating at various speeds. Further, since the flip-flop simply stores the preceding cycle, it is impossible to provide a delay beyond three clock periods, even if the number of flip-flop stages is increased, and thus it is impossible to access a device whose floating period of read data is long.

SUMMARY OF THE INVENTION

An object of the present invention is to provide a data bus buffer control circuit which is capable of delaying the data bus buffer output for a period corresponding to an arbitrary number of clock periods which can be set arbitrarily every read cycle.

According to the present invention, a data bus buffer control circuit includes a counter provided at an output of write data output delay selection means. The counter is presettable by a read/write signal during a read period so that the number of clock periods to be preset is varied according to a desired delay. The counter counts the clock signal supplied through a logic circuit after commencement of the write cycle and, when the content of the counter reaches the desired value, provides an output by which the output of the data bus buffer is enabled.

In the present invention, since the delay amount of the write data output is set every read cycle, it is possible to provide an optimum delay of the write data output for an accessed device an to interface low speed devices by increasing the number of bits of the counter.

DESCRIPTION OF THE PREFERRED EMBODIMENTS

Figure 1:
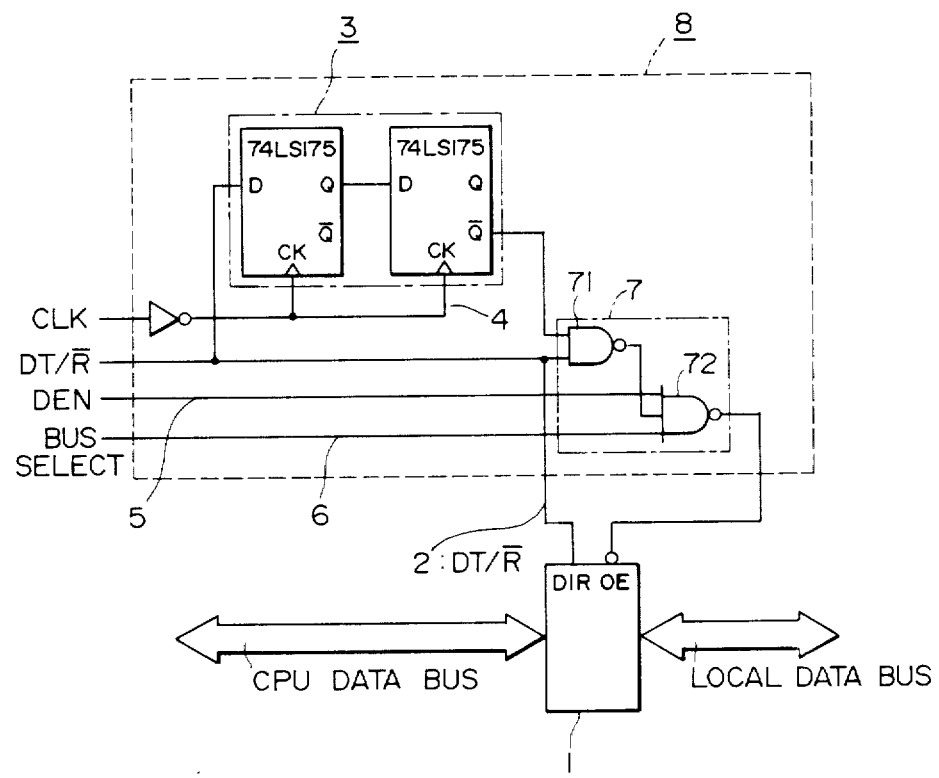
FIG. 1 is a block cicuit diagram of a conventional data bus buffer control circuit.
Figure 2:
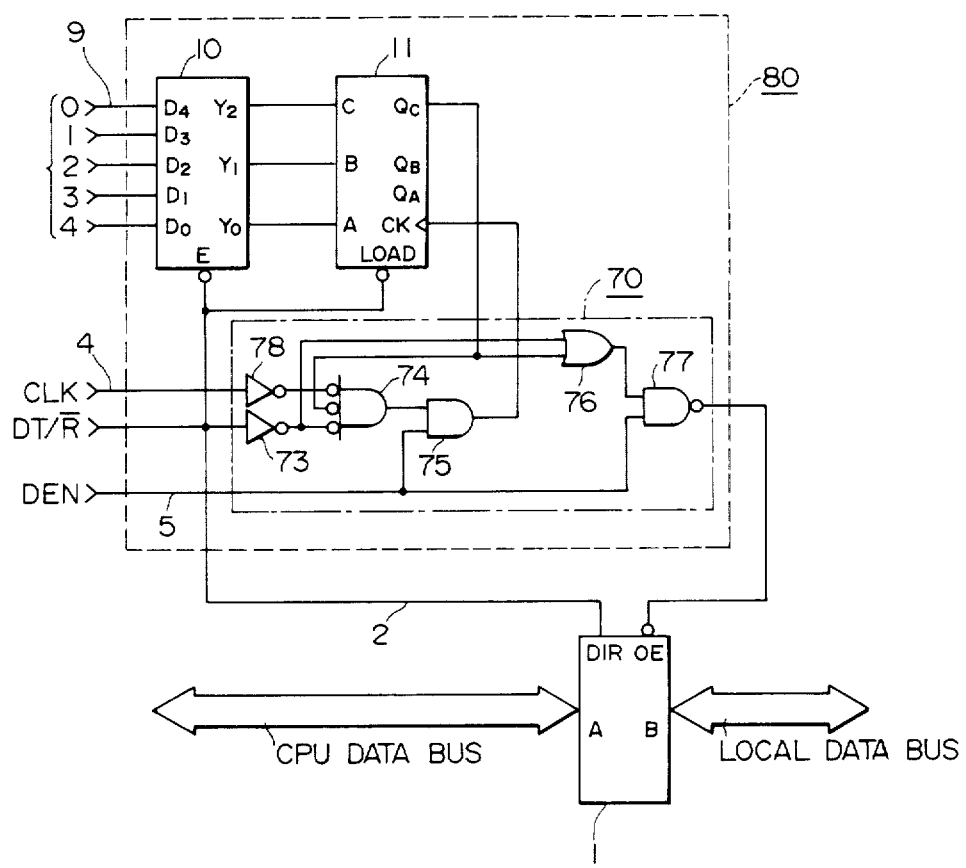
FIG. 2 is a block circuit diagram of an embodiment of the present invention.

In FIG. 2, in which elements the same as those shown in FIG. 1 are depicted by like reference numerals, the inventive data bus buffer control circuit 80 includes a control logic 70, inverters 73 and 78, AND gates 74 and 75, an OR gate 76, a NAND gate 77, a delay input signal line 9 for selecting the delay of the write data output in a range from one to four clock periods every read cycle, an encoder 10 for encoding the input on the delay input signal line 9 to binary data, and a counter 11 for storing the output of the encoder 10 and counting the clock periods corresponding to the delay of the write data output during a write period.

In operation, in the counter 11, the delay amount of the write data output, which is supplied through the delay input signal line 9 and converted to binary form by the encoder 10 during the DT/$\overline{R}$ signal period when the DT/$\overline{R}$ signal line 2 is "0", i.e., during the read cycle, is preset. In this case, it is assumed that the unit of delay is one clock period and that the desired amount of delay is set in four's complement form, with the maximum delay being four clock periods.

That is, when the desired delay is zero, the numerical value four is preset and, when the desired delay is four clock periods, the numerical value zero is preset. During this preset period, i.e., during the read cycle, the output of the OR gate 76 is "1", and thus the data bus buffer 1 can be enabled immediately when it enters the read cycle.

The output of the encoder 10 is preset in the counter 11 at the rising edge of a pulse of the signal $DT/\overline{R}$ supplied to the load terminal LOAD of the counter 11. When the amount of the desired delay is zero, a "1" bit, which represents $2^2=4$, is provided at a terminal $Y_2$ of the encoder 10. This "1" bit is supplied to an input terminal C of the counter 11 and presets the latter. Therefore, the output of terminal $Q_C$ of the counter 11 becomes "1", and thus the data bus buffer 1 is supplied with the signal $\overline{OE}$ through the OR gate 76 and the NAND gate 77, by which the signal on the CPU data bus is immediately provided on the local data bus.

When the delay amount to be set is three clock periods, a value $4-3=1$ is supplied to the encoder 10. Thus output terminals $Y_2$, $Y_1$ and $Y_0$ are at levels of "0", "0" and "1", respectively, which are supplied to the counter 11. Therefore, the signal logics of the output terminals $Q_C$, $Q_B$ and $Q_A$ of the counter 11 are at "0", "0" and "1", respectively, and the output at the terminal $Q_C$ at "0". Thus, the output of the AND gate 74 becomes "1" every time the clock signal CLK is in the low ("1") state, and this signal is supplied through the AND gate 75 to the counter 11.

When three clock signals have been supplied to the counter 11 in this manner, the content of the latter becomes $1+3=4$, and thus the output signal at the terminal $Q_C$ becomes "1", whereby the AND gate 74 is closed to prevent a clock input to the counter 11 and at the same time to supply the signal $\overline{OE}$ through the OR gate 76 and the NAND gate 77 to the data bus buffer 1 to allow the signal on the CPU bus to be supplied to the local data bus.

In this way, it is possible to provide an arbitrary amount of delay from the minimum of zero to the maximum of four clock periods with the increment of the delay amount being one clock period. The maximum value of the delay amount can be increased by increasing the number of bits of the encoder 10 and the counter 11.

In the embodiment of FIG. 2, the value indicative of the amount of delay and the difference thereof from the value four is set in the counter 11 so that, when the content of the counter 11 (the number of clock periods counted) reaches the value four, the signal $\overline{OE}$ is supplied to the data bus buffer 1. However, it is possible to set a value indicative of the amount of delay in the counter 11 so that, when the content thereof resulting from down-counting of the clock reaches zero, the signal $\overline{OE}$ is supplied to the buffer.

Further, although in the embodiment of FIG. 2, the value of the delay amount is preset through the encoder 10 in the counter 11, it is possible to indicate the value as a binary value and to directly preset that value in the counter.

As mentioned hereinbefore, according to the present invention, since it is possible to set an arbitrary amount of delay of the write data output every read cycle, it is possible to improve the bus speed by providing an optimum delay of the write data output to a device accessed every read cycle.

Furthermore, it is possible to interface to a slower device having a large floating time of the read data by increasing the number of digits of the counter.

We claim:

1. A data bus buffer control circuit responsive to at least one control signal for controlling a data bus buffer connecting a CPU data bus to a local data bus to permit transfer of data through said data bus buffer from said local data bus to said CPU data bus during a read cycle and to permit transfer of data through said data bus buffer from said CPU data bus to said local data bus during a subsequent write cycle, said control circuit comprising:

delay selection means for selecting an amount of delay corresponding to a number of clock periods per read cycle, said delay selection means being capable of selecting a plurality of different amounts of delay;

a counter responsive to said delay selection means for counting through said number of clock periods from a commencement of a next subsequent write cycle and providing a write enable output after a delay period from the commencement of said next subsequent write cycle corresponding to said number of clock periods; and control logic means responsive to said write enable output of said counter and said at least one control signal for controlling said data bus buffer during a read cycle to permit data to pass through said data bus buffer from said local data bus to said CPU data bus and for controlling said data bus buffer to prevent data on said CPU data bus from passing through said data bus buffer during said delay period and, after said write enable output of said counter is provided, to allow data on said CPU data bus to pass through said data bus buffer to said local data bus.

2. The data bus buffer control circuit as claimed in claim 1, wherein said delay selection means comprises means for supplying a preset signal to said counter in accordance with said selected amount of delay.

3. The data bus buffer control circuit as claimed in claim 2, wherein said delay selection means comprises means for receiving a binary preset signal and for supplying said binary preset signal to said counter.

4. The data bus buffer control circuit as claimed in claim 2, wherein said delay selection means comprises means for receiving a first signal representing said amount of delay and means for converting said first signal to a binary preset signal to be supplied to said counter.

5. The data bus buffer control circuit as claimed in claim 1, wherein said control logic means comprises means for receiving a write cycle signal indicating the commencement of a write cycle and means responsive to said write cycle signal for supplying clock pulses to said counter.

* * * * *